US010731551B2

(12) United States Patent
Tamashiro et al.

(10) Patent No.: US 10,731,551 B2
(45) Date of Patent: Aug. 4, 2020

(54) BALANCER DEVICE FOR INTERNAL COMBUSTION ENGINE (71) Applicant: HITACHI AUTOMOTIVE SYSTEMS, LTD., Hitachinaka-shi, Ibaraki (JP)

(72) Inventors: Hiroaki Tamashiro, Fujisawa (JP); Hidenori Tasaka, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/549,728

(22) PCT Filed: Feb. 9, 2016

(86) PCT No.: PCT/JP2016/053741
§ 371 (c)(1),
(2) Date: Aug. 9, 2017

(87) PCT Pub. No.: WO2016/132957
PCT Pub. Date: Aug. 25, 2016

(65) Prior Publication Data
US 2018/0030888 A1   Feb. 1, 2018

(30) Foreign Application Priority Data

Feb. 17, 2015   (JP) ................. 2015-028227

(51) Int. Cl.
*F16F 15/22*   (2006.01)
*F02B 67/06*   (2006.01)
*F01M 1/02*   (2006.01)
*F16F 15/26*   (2006.01)

(52) U.S. Cl.
CPC .............. *F02B 67/06* (2013.01); *F01M 1/02* (2013.01); *F16F 15/265* (2013.01); *F01M 2001/0276* (2013.01)

(58) Field of Classification Search
CPC .. F01M 1/02; F01M 2001/0276; F02B 67/06; F16F 15/26; F16F 15/265
USPC ................. 123/192.1, 192.2, 196 R, 198 C
See application file for complete search history.

(56) References Cited

U.S. PATENT DOCUMENTS

| 5,535,643 | A | * | 7/1996 | Garza ............... | F02B 67/04 |
| | | | | | 123/192.2 |
| 5,860,402 | A | * | 1/1999 | Sakurai ............. | F01L 1/024 |
| | | | | | 123/192.2 |
| 5,918,573 | A | * | 7/1999 | Killion ............. | F04B 23/04 |
| | | | | | 123/192.2 |

(Continued)

FOREIGN PATENT DOCUMENTS

| JP | 2002-195387 A | | 7/2002 |
| JP | 2007-24188 A | * | 2/2007 |

(Continued)

*Primary Examiner* — George C Jin
*Assistant Examiner* — Teuta B Holbrook
(74) *Attorney, Agent, or Firm* — Foley & Lardner LLP (57) ABSTRACT

Provided is a balancer device for an internal combustion engine capable of effectively decreasing gear rattle between gears of a drive mechanism. A balancer drive gear and a balancer driven gear are arranged on a second end side of a drive-side balancer shaft and a second end side of a driven-side balancer shaft, respectively, and an oil pump is arranged on a first end side of the driven-side balancer shaft via the drive mechanism.

2 Claims, 8 Drawing Sheets

(56) References Cited

U.S. PATENT DOCUMENTS

| | | | | |
|---|---|---|---|---|
| 6,189,499 B1 * | 2/2001 | Iwata | ............... | F16F 15/265 123/192.2 |
| 6,205,970 B1 * | 3/2001 | Iwata | ............... | F02B 75/20 123/192.2 |
| 6,786,206 B2 * | 9/2004 | Koga | ............... | F04B 9/02 123/198 C |
| 2004/0028537 A1 * | 2/2004 | Shulver | ............... | F02B 67/04 417/310 |
| 2007/0227476 A1 * | 10/2007 | Tsuruta | ............... | F01M 1/16 123/41.86 |
| 2007/0289567 A1 * | 12/2007 | Eto | ............... | F02B 75/048 123/192.1 |
| 2009/0016907 A1 * | 1/2009 | Williamson | ............... | F16F 15/265 417/365 |
| 2009/0038575 A1 * | 2/2009 | Ohsawa | ............... | F01M 11/064 123/192.2 |
| 2010/0154735 A1 * | 6/2010 | Kato | ............... | F16F 15/267 123/192.2 |
| 2013/0104835 A1 * | 5/2013 | Lee | ............... | F16F 15/265 123/192.2 |
| 2013/0146015 A1 * | 6/2013 | Akaishi | ............... | F02B 75/065 123/192.2 |
| 2014/0109860 A1 * | 4/2014 | Raab | ............... | F16F 15/267 123/192.2 |
| 2015/0083068 A1 * | 3/2015 | Sugiura | ............... | F16F 15/264 123/192.2 |
| 2015/0104343 A1 * | 4/2015 | Lee | ............... | F16F 15/267 418/131 |

FOREIGN PATENT DOCUMENTS

| | | | |
|---|---|---|---|
| JP | 2007-024188 A | | 2/2007 |
| JP | 2007024188 A | * | 2/2007 |
| JP | 2007-192263 | * | 8/2007 |
| JP | 2007-192263 A | | 8/2007 |
| JP | 2007192263 A | * | 8/2007 |
| JP | 4665638 B2 | | 4/2011 |

* cited by examiner

BALANCER DEVICE FOR INTERNAL COMBUSTION ENGINE

TECHNICAL FIELD

The present invention relates to a balancer device for an internal combustion engine.

BACKGROUND ART

In Patent Literature 1, there is disclosed a balancer device for an internal combustion engine coupled to an oil pump. A torque from a crankshaft is input to one end side of a drive-side balancer shaft, and is transmitted to one end side of a driven-side balancer shaft via a balancer drive gear and a balancer driven gear. The torque input to the one end side of the driven-side balancer shaft is transmitted to an oil pump via a drive mechanism including two gears provided on the other end side.

CITATION LIST

Patent Literature

PTL 1: JP 4665638 B2

SUMMARY OF INVENTION

Technical Problem

In the above-mentioned related art, a part of the drive-side balancer shaft from a position at which the balancer drive gear is provided to the other end does not function as a torque transmission path for transmitting the torque input from the crankshaft to the drive mechanism. Therefore, a torsion bar effect through a torsion torque generated on the drive-side balancer shaft and the driven-side balancer shaft cannot be sufficiently provided, and thus there is such a problem that gear rattle cannot be effectively decreased between the gears in the drive mechanism. The present invention has an object to provide a balancer device for an internal combustion engine capable of effectively decreasing gear rattle between gears of a drive mechanism.

Solution to Problem

According to one embodiment of the present invention, a balancer drive gear and a balancer driven gear are arranged on the other end side of a drive-side balancer shaft and the other end side of a driven-side balancer shaft, respectively, and an oil pump is arranged on the one end side of the driven-side balancer shaft via a drive mechanism.

Thus, gear rattle can effectively be decreased between the gears in the drive mechanism.

DESCRIPTION OF EMBODIMENTS

First Embodiment

Figure 1:
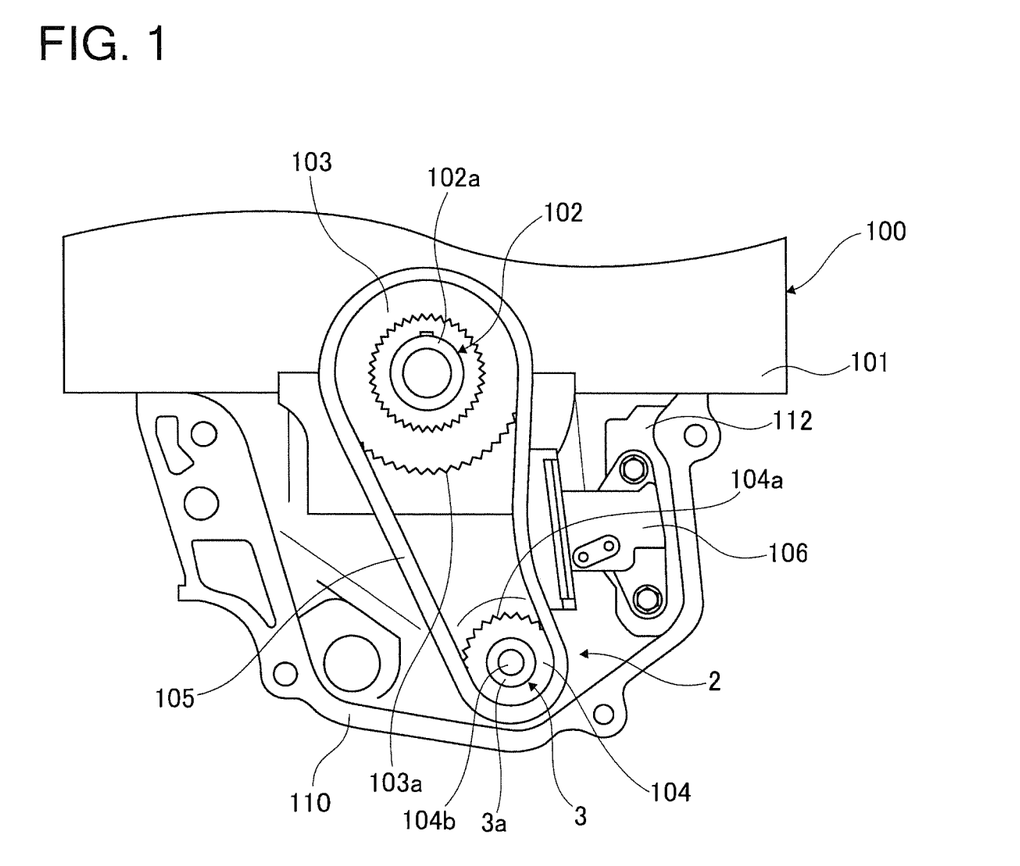
FIG. 1 is a front view of a lower part of an engine 100 on which a balancer device 2 according to a first embodiment is installed.

FIG. 1 is a front view of a lower part of an engine 100 on which a balancer device 2 according to a first embodiment is installed. The engine (internal combustion engine) 100 is, for example, an inline four-cylinder reciprocating engine. A crankcase 1 is fixed to a lower part of a cylinder block 101. The crankcase 1 is made of aluminum alloy. An oil pan (not shown) inside which engine oil is stored is fixed to the lower part of the crankcase 1. A crankshaft 102 is rotatably supported with respect to the crankcase 1 by the crankcase 1 and a bearing cap (not shown). The crankshaft 102 is arranged so that an axial direction of the crankshaft 102 is along an engine front-rear direction. The bearing cap is fixed to the cylinder block 101 with a bearing bolt (not shown). A crank sprocket 103 is fixed to a first end 102a on one end side (front side of the engine 100) in the axial direction of the crankshaft 102. A gear tooth part 103a is formed on an outer periphery of the crank sprocket 103.

The balancer device 2 configured to suppress second-order vibration of the engine 100 is contained in a space surrounded by the lower part of the crankcase 1 and the oil pan. The balancer device 2 includes a drive-side balancer shaft 3. An axial direction of the drive-side balancer shaft 3 matches the axial direction of the crankshaft 102, namely, the engine front-rear direction. A balancer sprocket (chain drive part) 104 is fixed to a first end 3a on one end side in the axial direction of the drive-side balancer shaft 3. The balancer sprocket 104 is fixed to the first end 3a with a sprocket fixing bolt 104b. A gear tooth part 104a is formed on an outer periphery of the balancer sprocket 104. The number of teeth of the gear tooth part 104a is set to be ½ times of the number of teeth of the gear tooth part 103a. A drive chain 105 is hung across the balancer sprocket 104 and the crank sprocket 103. A torque (rotation force) from the crankshaft 102 is transmitted to the first end 3a of the drive-side balancer shaft 3 via the drive chain 105. A constant tension is always applied to the drive chain 105 by a hydraulic tensioner 106. The tensioner 106 is supported by the crankcase 1. In the first embodiment, the drive-side balancer shaft 3 is of the chain drive type, and thus the rotation speed of the crankshaft 102 can be changed, and then can be transmitted to the drive-side balancer shaft 3 at a remote position. Moreover, the chain drive is advantageous in reduction in size compared with the gear drive.

Figure 2:
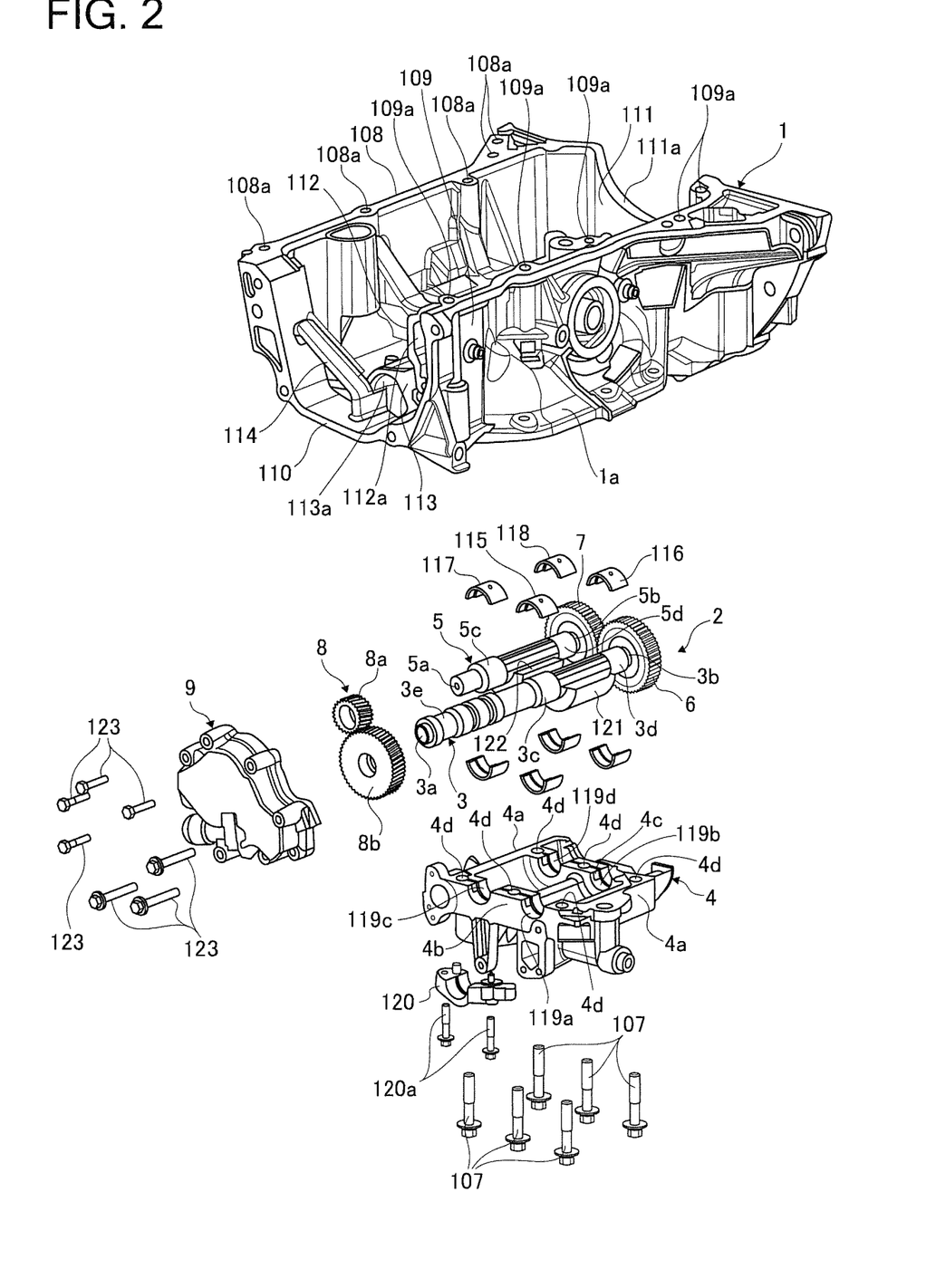
FIG. 2 is an exploded perspective view for illustrating the balancer device 2 according to the first embodiment.
Figure 3:
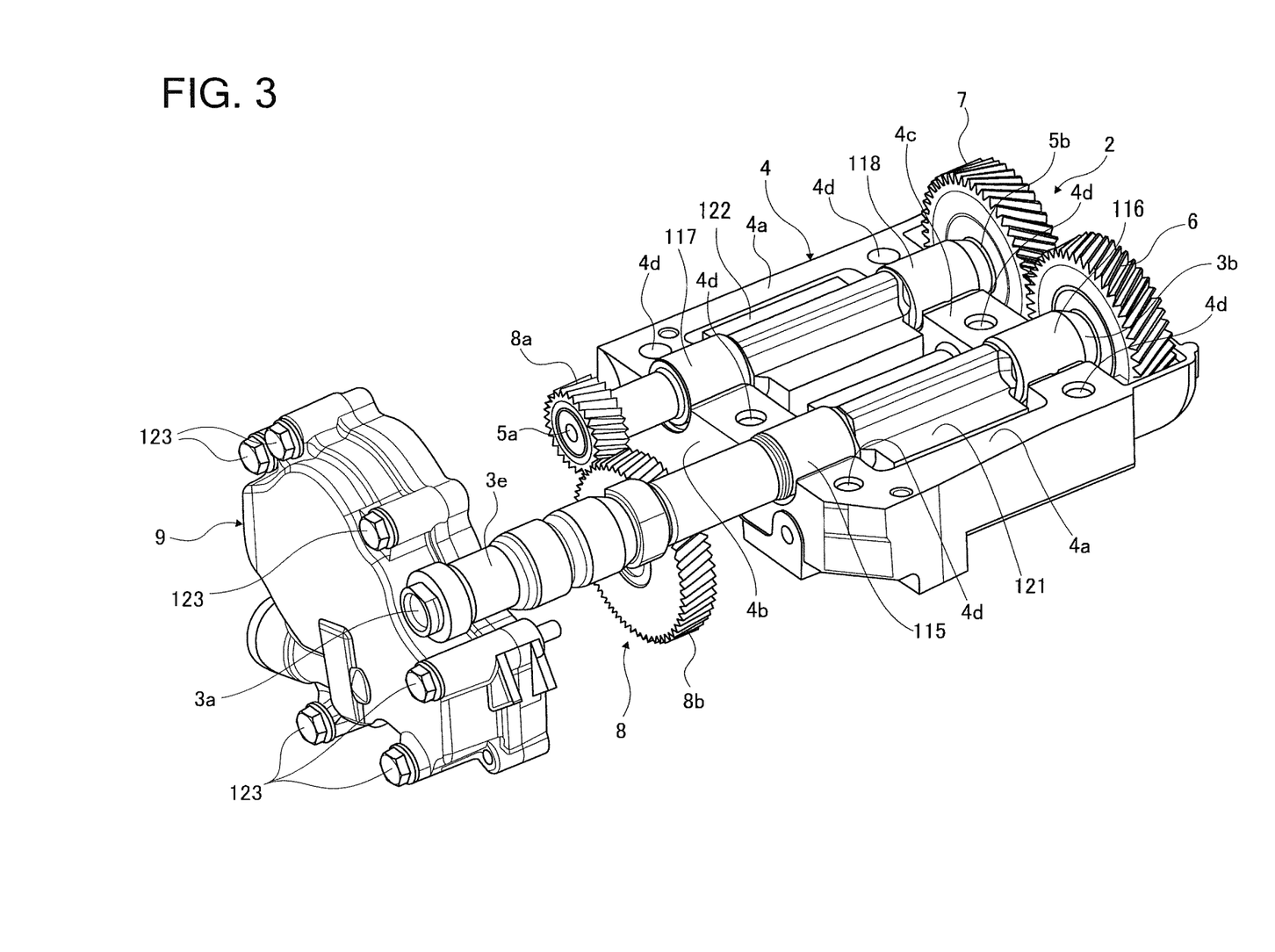
FIG. 3 is a perspective view of a principal part of the balancer device 2 according to the first embodiment.

FIG. 2 is an exploded perspective view for illustrating the balancer device 2 according to the first embodiment, and FIG. 3 is a perspective view of a principal part of the balancer device 2 according to the first embodiment. The balancer device 2 includes the crankcase 1 and a lower housing 4, which serve as a housing, the drive-side balancer shaft 3, a driven-side balancer shaft 5, a balancer drive gear 6, and a balancer driven gear 7. The lower housing 4 is fixed to the lower part of the crankcase 1 with six housing fastener bolts 107. A lower part of the lower housing 4 is covered by the oil pan. The crankcase 1 and the lower housing 4 have a pair of left and right frame-shape deck parts 1a and 1a and a pair of left and right frame-shape deck parts 4a and 4a, respectively, so as to extend in the engine front-rear direction in outer peripheral parts of mating positions at which the crankcase 1 and the lower housing 4 oppose each other from above and below. In the lower housing 4, a pair of front and rear crossbeam deck parts 4b and 4c for coupling both the frame-shape deck parts 4a and 4a to each other in a transverse form is integrally formed. Meanwhile, in the crankcase 1, a pair of front and rear crossbeam deck parts (not shown) traversing both the frame deck parts 1a and 1a is also similarly formed at positions corresponding to both the crossbeam deck parts 4b and 4c. Bolt holes 4d through which the respective housing fastener bolts 107 are inserted are formed at predetermined positions on an outer periphery side of both the frame-shape deck parts 4a and 4a. Female thread holes (not shown) into which the respective housing fastener bolts 107 are screwed are formed in the crankcase 1.

The crankcase 1 is formed in a U shape viewed from the front side. The crankcase 1 includes a pair of left and right side walls 108 and 109, a front end wall 110, and a rear end wall 111. Both of the side walls 108 and 109 rise upward from both the frame-shape deck parts 1a and 1a, respectively. Bolt holes 108a and 109a through which bolts (not shown) for fixing the crankcase 1 to the cylinder block 101 are inserted are formed at predetermined positions in the engine front-rear direction in upper parts of both the side walls 108 and 109. A support wall 112 to which the tensioner 106 is fixed is integrally coupled to an inner surface on a front end side of the right side wall 109. The support wall 112 is formed in a generally rectangular shape viewed from the front side. An oil supply chamber 112a is formed inside the support wall 112. A reinforcement rib 113 coupled to a top surface of the front end wall 110 is integrally provided at a lower part of the support wall 112. The reinforcement rib 113 is provided so as to extend toward the left side wall 108 along the top surface of the front end wall 110. A cutout part 113a having a half circular arc shape through which the drive-side balancer shaft 3 is inserted is formed in the reinforcement rib 113. The front end wall 110 couples opposing inner surfaces of both the side walls 108 and 109 to each other on a bottom part side and the front end side of both the side walls 108 and 109. A bridge 114 having a generally chevron shape is provided at a position opposing the reinforcement rib 113 of the front end wall 110. A lower end of the bridge 114 is coupled to a top surface of the front end wall 110. An upper end of the bridge 114 is coupled to the left side wall 108. A lower part of the bridge 114 is coupled to a tip part of the reinforcement rib 113. A space portion having a generally triangle shape is formed between the bridge 114 and the front end wall 110. The driven-side balancer shaft 5 faces the space portion. Both end edges of the rear end wall 111 are integrally coupled to opposing inner surfaces of both the side walls 108 and 109. On the rear end wall 111, a bearing groove 111a having a half circular arc shape for supporting a bearing for the crankshaft 102 is formed.

The drive-side balancer shaft 3 and the driven-side balancer shaft 5 are rotatably supported between the crossbeam deck parts of the crankcase 1 and the crossbeam deck parts 4b and 4c of the lower housing 4. The axial direction of the driven-side balancer shaft 5 matches the axial direction of the drive-side balancer shaft 3. Second and third journal parts 3c and 3d having cylinder shapes are formed at a center and in the vicinity of a second end 3b on the other end side (rear side of the engine 100) in the axial direction of the drive-side balancer shaft 3. Both the journal parts 3c and 3d are supported by the crankcase 1 and the lower housing 4 via two-piece plain bearings 115 and 116. First and second journal parts 5c and 5d having cylinder shapes are formed in the vicinity of a first end 5a on the one end side and in the vicinity of a second end 5b on the other end side in the axial direction of the driven-side balancer shaft 5. The first journal part 5c is provided at the same position as the second journal part 3c of the drive-side balancer shaft 3 in the engine front-rear direction. The second journal part 5d is provided at the same position as the third journal part 3d of the drive-side balancer shaft 3 in the engine front-rear direction. Both the journal parts 5c and 5d are supported by the crankcase 1 and the lower housing 4 via two-piece plain bearings 117 and 118. Bearing grooves 119a, 119b, 119c, and 119d each having a half circular arc shape to which lower side parts of the respective two-piece plain bearings 115, 116, 117, and 118 are mounted are formed in the crossbeam deck parts 4b and 4c of the lower housing 4. Meanwhile, bearing grooves (not shown) each having a half circular arc shape to which upper side parts of the respective two-piece plain bearings 115, 116, 117, and 118 are mounted are also similarly formed at positions corresponding to the respective bearing grooves 119a, 119b, 119c, and 119d in the crossbeam deck parts of the crankcase 1. Moreover, a first journal part 3e having a cylinder shape is formed in the vicinity of the first end 3a of the drive-side balancer shaft 3. The first journal part 3e is rotatably supported via a bearing cap 120 and a bearing groove (not shown) formed on the lower part of the crankcase 1. The bearing cap 120 is fixed to the lower part of the crankcase 1 with two bearing cap fastener bolts 120a.

A drive-side balance weight 121 having a half cylinder shape is formed integrally with the drive-side balancer shaft 3 between the second journal part 3c and the third journal part 3d in the axial direction of the drive-side balancer shaft 3. A driven-side balance weight 122 having a half cylinder shape is formed integrally with the driven-side balancer shaft 5 between the first journal part 5c and the second journal part 5d in the axial direction of the driven-side balancer shaft 5. The second end 3b of the drive-side balancer shaft 3 is press-fitted and fixed to the balancer drive gear 6. The balancer drive gear 6 is a helical gear. The driven-side balancer shaft 5 is formed so as to have an axial length shorter than that of the drive-side balancer shaft 3. The balancer driven gear 7 is press-fitted and fixed to the second end 5b of the driven-side balancer shaft 5. The balancer driven gear 7 is a helical gear configured to mesh with the balancer drive gear 6. The numbers of teeth of the balancer drive gear 6 and the balancer driven gear 7 match each other. As a result of the employment of the helical gears as the balancer drive gear 6 and the balancer driven gear 7, silence can be achieved under a high speed and a high load.

An oil pump 9 is coupled to the first end 5a of the driven-side balancer shaft 5 via a drive mechanism 8. The drive mechanism 8 is arranged in a space between the lower housing 4 and the oil pump 9 in the axial direction of the drive-side balancer shaft 3. The drive mechanism 8 includes an oil pump drive gear 8a and an oil pump driven gear 8b. The oil pump drive gear 8a and the oil pump driven gear 8b are helical gears configured to mesh with each other. As a result of the employment of the helical gears as the oil pump drive gear 8a and the oil pump driven gear 8b, silence can be achieved under a high speed and a high load. The number of teeth $N_A$ of the oil pump drive gear 8a is set to be ½ times of the number of teeth $N_B$ of the oil pump driven gear 8b. The first end 5a of the driven-side balancer shaft 5 is press-fitted and fixed to the oil pump drive gear 8a. An oil pump drive shaft 9a (refer to FIG. 4) of the oil pump 9 is press-fitted and fixed to the oil pump driven gear 8b.

Figure 4:
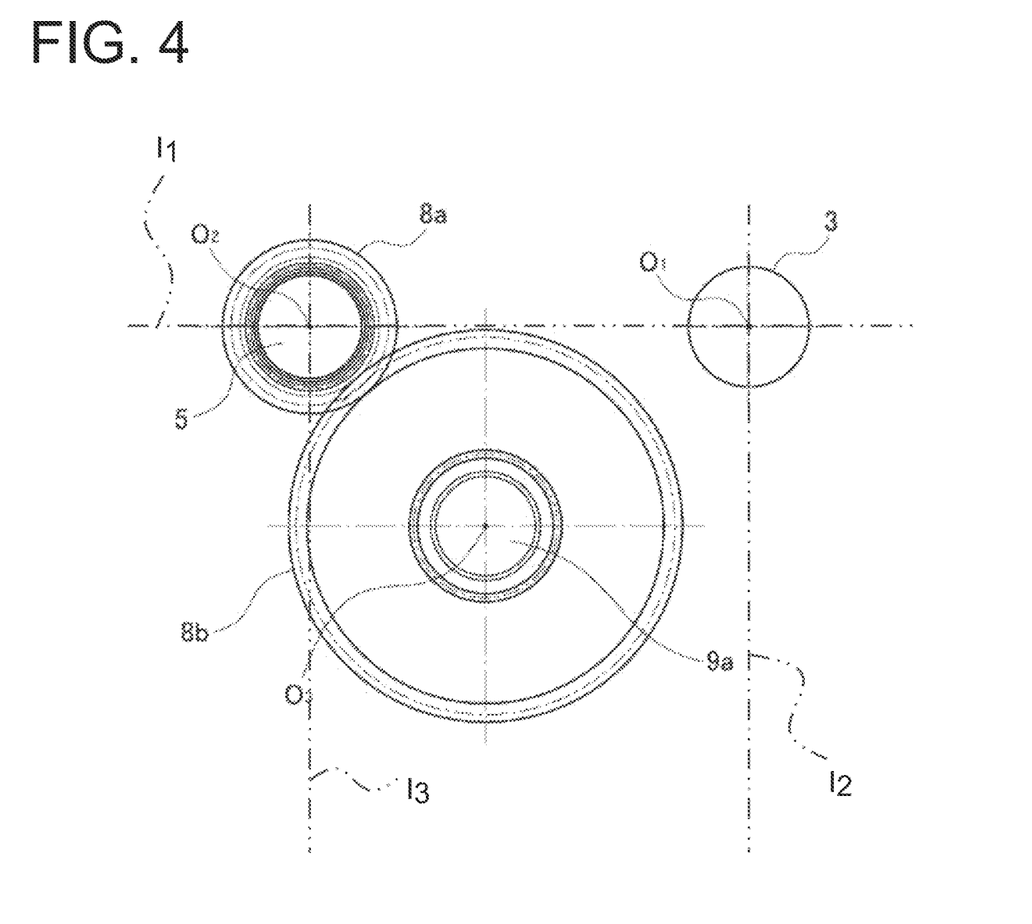
FIG. 4 is a schematic view for illustrating a position relationship between a drive-side balancer shaft 3, a driven-side balancer shaft 5, and an oil pump drive shaft 9a of the first embodiment.

FIG. 4 is a schematic view for illustrating a position relationship between the drive-side balancer shaft 3, the driven-side balancer shaft 5, and the oil pump drive shaft 9a of the first embodiment. As illustrated in FIG. 4, a rotation center $O_1$ of the drive-side balancer shaft 3 and a rotation center $O_2$ of the driven-side balancer shaft 5 are arranged in the same position in the up-down direction with rotational axes orthogonal to line $I_1$. A rotation center $O_3$ of the oil pump drive shaft 9a is arranged below the rotation centers $O_1$ and $O_2$ of the drive-side balancer shaft 3 and the driven-side balancer shaft 5. Moreover, the rotation center $O_3$ of the oil pump drive shaft 9a is arranged between the rotation center $O_1$ of the drive-side balancer shaft 3 and the rotation center $O_2$ of the driven-side balancer shaft 5 in the engine left-right direction with a rotational axis between lines $I_2$ and $I_3$. In other words, the oil pump driven gear 8b is provided at a position on the drive-side balancer shaft 3 side with respect to the driven-side balancer shaft 5 in a direction perpendicular to the axial direction of the driven-side balancer shaft 5.

The oil pump 9 is a variable displacement type oil pump configured to change a displacement of a pump chamber in accordance with a predetermined state. The variable displacement oil pump is a vane pump having a mechanism for decreasing the displacement of the pump chamber during a pump high rotation, and, for example, a publicly known pump disclosed in JP 2011-111926 A and the like is used. The oil pump 9 is arranged in a space between the first end 3a of the drive-side balancer shaft 3 and the oil pump driven gear 8b in the axial direction of the drive-side balancer shaft 3. Moreover, the oil pump 9 is arranged in a space between the drive-side balancer shaft 3 and the driven-side balancer shaft 5 in a direction perpendicular to the axial direction of the drive-side balancer shaft 3. The oil pump 9 is fixed to the lower housing 4 with six oil pump fastener bolts 123. As a result, high support rigidity is acquired. The oil pump 9 is configured to suck the oil stored in the oil pan to discharge the oil to a main oil gallery (not shown). The oil supplied to the main oil gallery is used mainly for lubrication of respective slide parts of the engine 100. A part of the oil supplied to the main oil gallery is supplied to the respective two-piece plain bearings 115, 116, 117, and 118 and the oil supply chamber 112a via oil passages (not shown) formed in the lower housing 4. The oil supplied to the oil supply chamber 112a is used to generate a pressing force of the tensioner 106.

Decrease in Gear Rattle Through Torsion Bar Effect

In the balancer device 2 according to the first embodiment, when the engine 100 is started and the crankshaft 102 is rotationally driven, the drive-side balancer shaft 3 rotates at a speed twice as high as the crankshaft 102 via the crank sprocket 103, the drive chain 105, and the balancer sprocket 104. The driven-side balancer shaft 5 rotates at the same speed in the opposite direction from the rotational direction of the drive-side balancer shaft 3 via the rotation transmission through the meshing between the balancer drive gear 6 and the balancer driven gear 7. As a result, the drive-side balance weight 121 and the driven-side balance weight 122 cancel left and right centrifugal forces of the drive-side balancer shaft 3 and the driven-side balancer shaft 5 themselves while rotating in directions opposite to each other. In this way, as the drive-side balancer shaft 3 and the driven-side balancer shaft 5 rotate, the drive-side balance weight 121 and the driven-side balance weight 122 rotate to transmit a vibratory force to the engine 100, thereby suppressing the second-order vibration of the engine 100.

The driven-side balancer shaft 5 is connected to the oil pump drive shaft 9a of the oil pump 9 via the drive mechanism 8 including the oil pump drive gear 8a and the oil pump driven gear 8b. Then, the oil pump 9 provides work of sucking and discharging the oil. Thus, a load is generated between the oil pump drive gear 8a and the oil pump driven gear 8b. A torsion angle is generated between the first end 3a of the drive-side balancer shaft 3 and the first end 5a of the driven-side balancer shaft 5 with this load. Therefore, a torsion torque resulting from the torsion angle is generated on the drive-side balancer shaft 3 and the driven-side balancer shaft 5. This torsion torque is always generated with respect to a rotation load direction. Thus, this torsion torque generates a torsion bar effect to apply a load in the rotation load direction, and the teeth of the oil pump drive gear 8a and the teeth of the oil pump driven gear 8b are in contact with each other in the rotation load direction. As a result, the backlash becomes zero, and the gear rattle can thus be decreased. An input torque from the crankshaft 102 is always fluctuating, and a larger torque fluctuation can be handled as the torsion angle increases. In other words, the torsion bar effect increases as the torsion angle increases, thereby more effectively decreasing the gear rattle.

Figure 5:
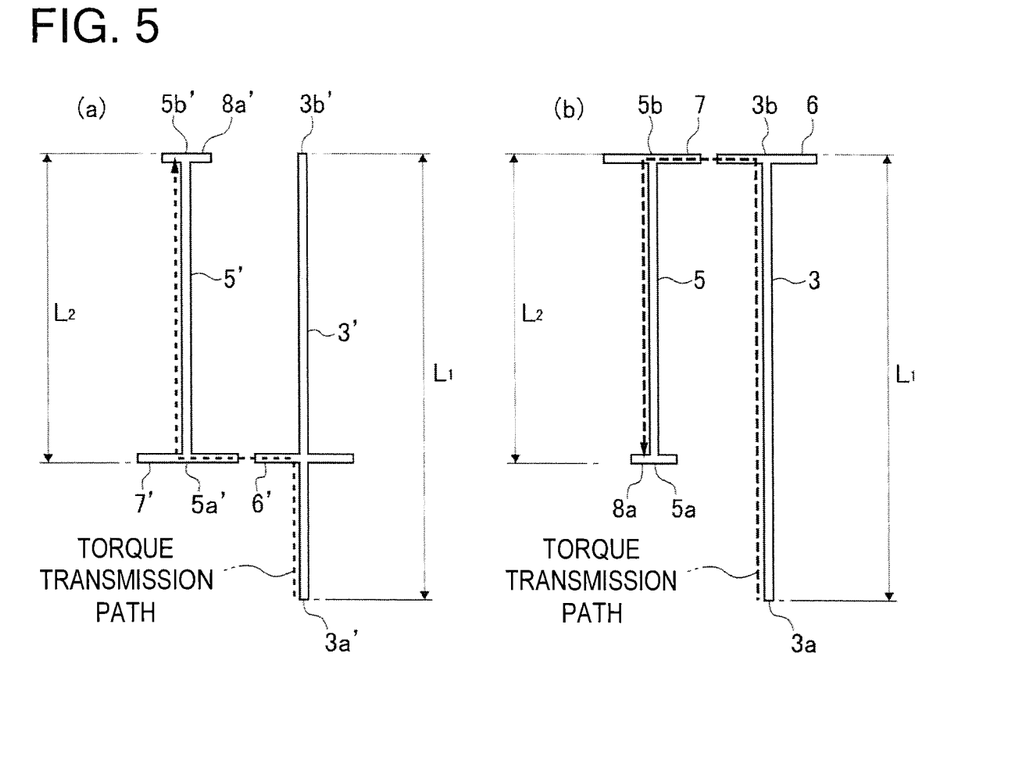
FIG. 5(a) is a schematic view for illustrating a torque transmission path of a balancer device according to the related art.
FIG. 5(b) is a schematic view for illustrating a torque transmission path of the balancer device 2 according to the first embodiment.

FIG. 5(a) is a schematic view for illustrating a torque transmission path of a balancer device according to the related art, and FIG. 5(b) is a schematic view for illustrating a torque transmission path of the balancer device 2 according to the first embodiment. Both shaft lengths of drive-side balancer shafts 3 and 3' are $L_1$, and both shaft lengths of driven-side balancer shafts 5 and 5' are $L_2$. Moreover, the torque from the crankshafts is assumed to be input to first ends 3a and 3a' of the drive-side balancer shafts 3 and 3'. In the related-art balancer device, a balancer driven gear 7' is provided on a first end 5a' of the driven-side balancer shaft 5', and an oil pump drive gear 8a' is provided on a second end 5b'. A balancer drive gear 6' is provided at the same position as that of the balancer driven gear 7' in an axial direction of the drive-side balancer shaft 3', namely, a position separated from the first end 3a' toward a second end 3b' side by ($L_1-L_2$). Thus, in the drive-side balancer shaft 3' and the driven-side balancer shaft 5', the length of a torque transmission path from the first end 3a' to the second end 5b' is ($L_1-L_2$)+$L_2$=$L_1$. In other words, in the related-art balancer device, a portion having the shaft length $L_2$ from the position of the balancer drive gear 6' to the second end 3b' does not function as the torque transmission path in the drive-side balancer shaft 3'. The torsion angle is proportional to the torque transmission path length, and hence the torsion bar effect through the torsion torque cannot sufficiently be provided in the related-art balancer device. In the related-art balancer device, if the shaft lengths $L_1$ and $L_2$ are increased, a sufficient torque transmission path length can be secured, but the size of the device consequently increases.

Figure 6:
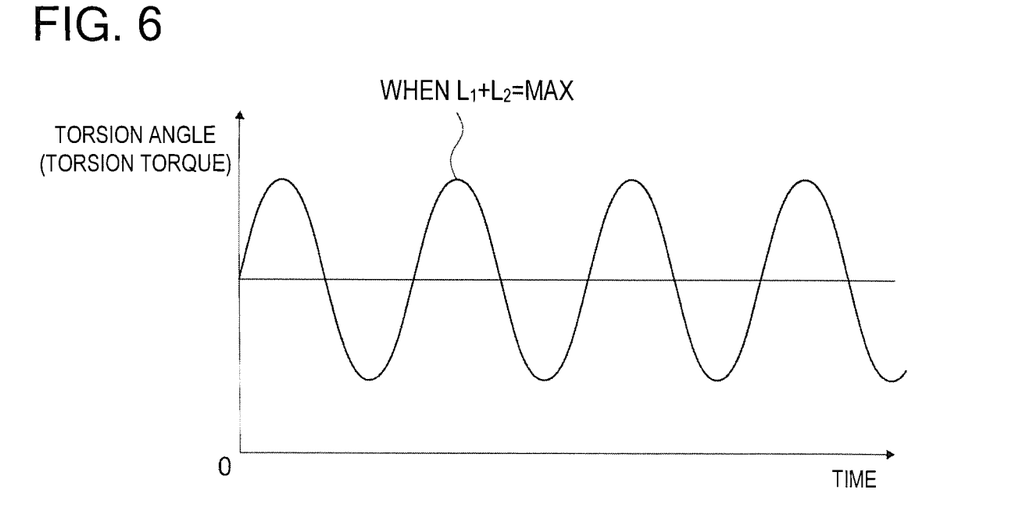
FIG. 6 is a concept graph for showing a temporal change in a torsion angle (torsion torque) generated between a first end 3a and a second end 3b of the first embodiment.

In contrast, in the balancer device 2 according to the first embodiment, the balancer drive gear 6 and the balancer driven gear 7 are provided on the second ends 3b and 5b of the drive-side balancer shaft 3 and the driven-side balancer shaft 5, respectively, and the oil pump drive gear 8a is provided on the first end 5a of the driven-side balancer shaft 5. Therefore, the length of the torque transmission path is $L_1+L_2$ in the drive-side balancer shaft 3 and the driven-side balancer shaft 5. In other words, the balancer device 2 according to the first embodiment can cause the overall length of the drive-side balancer shaft 3 and the driven-side balancer shaft 5 to function as the torque transmission path. As a result, a sufficient torque transmission path length can be secured without increasing the shaft lengths $L_1$ and $L_2$. Thus, as shown in FIG. 6, the torsion angle can be secured as much as possible, and a sufficient torsion bar effect can be provided. Thus, the gear rattle between the oil pump drive gear 8a and the oil pump drive gear 8b in the drive mechanism 8 can more effectively be decreased compared with the related-art balancer device.

Drive of Oil Pump at Decreased Speed

In the first embodiment, an oil pump of the variable displacement type is employed as the oil pump 9. The rotation speed of the oil pump of the variable displacement type is preferably low in terms of an original purpose of the pump for suppressing a discharge flowrate at a high engine rotation, thereby improving fuel efficiency. Moreover, in general, friction of the oil pump is low at a low rotation and is high at a high rotation, and hence drive at the low rotation is advantageous in terms of the fuel efficiency. In view of this, in the drive mechanism 8 of the first embodiment, the number of teeth $N_A$ of the oil pump drive gear 8a is set to be ½ times of the number of teeth $N_B$ of the oil pump driven gear 8b. As a result, the rotation speed of the oil pump drive shaft 9a is decreased to ½ times of the rotation speed of the driven-side balancer shaft 5. Thus, the oil pump 9 can be driven at a relatively low rotation, and degradation of the fuel efficiency can thus be suppressed.

According to the first embodiment, the following actions and effects are provided.

(1-1) The balancer device for an internal combustion engine includes: the drive-side balancer shaft 3 configured to rotate based on a rotation force transmitted from the crankshaft 102 to the one end (first end 3a) side of the drive-side balancer shaft 3; the balancer drive gear 6 provided on the other end (second end 3b) side of the drive-side balancer shaft 3 and configured to rotate integrally with the drive-side balancer shaft 3; the balancer driven gear 7 which meshes with the balancer drive gear 6; the driven-side balancer shaft 5 which is fixed to the balancer driven gear 7 on the other end side of the driven-side balancer shaft 5, extends beyond the one end side of the drive-side balancer shaft 3, and is configured to rotate integrally with the balancer driven gear; the drive mechanism 8 provided on the one end (first end 5a) side of the driven-side balancer shaft 5 and including at least two gears meshing with each other; and the oil pump 9 driven based on a rotation force transmitted from the drive mechanism 8.

Thus, the overall length of the drive-side balancer shaft 3 and the driven-side balancer shaft 5 can be caused to function as the torque transmission path for transmitting the torque to the drive mechanism 8, and the gear rattle between the gears in the drive mechanism 8 can thus effectively be decreased.

(2-2) In the balancer device for an internal combustion engine according to Item (1-1) described above, the drive mechanism 8 includes the oil pump drive gear 8a provided on the driven-side balancer shaft 5, and the oil pump driven gear 8b that meshes with the oil pump drive gear 8a.

Thus, the overall length of the drive-side balancer shaft 3 and the driven-side balancer shaft 5 can be caused to function as the torque transmission path for transmitting the torque to the oil pump drive gear 8a, and the gear rattle between the oil pump drive gear 8a and the oil pump driven gear 8b can thus effectively be decreased.

(3-3) In the balancer device for an internal combustion engine according to Item (2-2) described above, the oil pump driven gear 8b is provided on the drive-side balancer shaft 3 side in the direction perpendicular to the axial direction (engine left/right direction) of the driven-side balancer shaft 5.

Thus, an arrangement space in the direction perpendicular to the axial direction of the driven-side balancer shaft 5 can be decreased, thereby making the device compact.

(4-4) In the balancer device for an internal combustion engine according to Item (3-3) described above, the balancer device further includes the oil pump drive shaft 9a provided on the oil pump driven gear 8b and configured to rotate integrally with the oil pump driven gear 8b. The oil pump drive shaft 9a is arranged between the drive-side balancer shaft 3 and the driven-side balancer shaft 5 in the direction perpendicular to the axial direction of the drive-side balancer shaft 3.

Thus, an arrangement space in the direction perpendicular to the axial direction of the drive-side balancer shaft 3 can be decreased, thereby making the device compact.

(5-5) In the balancer device for an internal combustion engine according to Item (4-4) described above, the oil pump 9 is arranged between the one end side of the drive-side balancer shaft 3 and the oil pump driven gear 8b in the axial direction of the drive-side balancer shaft 3.

Thus, a space between the first end 3a of the drive-side balancer shaft 3 and the oil pump driven gear 8b, which is a dead space in the related art, can effectively be used. As a result, an arrangement space in the axial direction of the drive-side balancer shaft 3 can be decreased, thereby making the device compact.

(6-13) The balancer device for an internal combustion engine includes: the housing (crankcase 1 and lower housing 4) fixed to the internal combustion engine (engine 100); the drive-side balancer shaft 3 rotatably contained inside the housing; the chain drive part (balancer sprocket 104), which is provided on the one end side of the drive-side balancer shaft 3, and to which a rotation force is transmitted from the crankshaft 102 via the drive chain 105; the balancer drive gear 6 provided on the other end side of the drive-side balancer shaft 3 and configured to rotate integrally with the drive-side balancer shaft 3; the balancer driven gear 7 that meshes with the balancer drive gear 6; the driven-side balancer shaft 5, which is fixed to the balancer driven gear 7 on the other end side of the driven-side balancer shaft 5, extends beyond the one end side of the drive-side balancer shaft 3, is configured to rotate integrally with the balancer driven gear 7, and is contained inside the housing; the oil pump drive gear 8a provided on the one end side of the driven-side balancer shaft 5 and configured to rotate integrally with the driven-side balancer shaft 5; the oil pump driven gear 8*b* that meshes with the oil pump drive gear 8*a*; and the oil pump 9 driven via the oil pump driven gear 8*b*.

Thus, the overall length of the drive-side balancer shaft 3 and the driven-side balancer shaft 5 can be caused to function as the torque transmission path for transmitting the torque to the oil pump drive gear 8*a*, and the gear rattle between the oil pump drive gear 8*a* and the oil pump driven gear 8*b* can thus effectively be decreased.

(7-14) In the balancer device for an internal combustion engine according to Item (6-13) described above, the oil pump 9 is fixed to the lower housing 4.

Thus, the high support rigidity is provided for the oil pump 9.

(8-15) In the balancer device for an internal combustion engine according to Item (7-14) described above, the oil pump 9 is arranged between the chain drive part and the oil pump driven gear 8*b* in the axial direction of the drive-side balancer shaft 3.

Thus, a space between the chain drive part and the oil pump driven gear 8*b*, which is a dead space in the related art, can effectively be used. As a result, an arrangement space in the axial direction of the drive-side balancer shaft 3 can be decreased, thereby making the device compact.

(9-16) A crankcase integrated balancer device in which the balancer device 2 is provided integrally with the crankcase 1 includes: the drive-side balancer shaft 3 configured to rotate based on a rotation force transmitted from the crankshaft 102 to the one end side of the drive-side balancer shaft 3 via the drive chain 105; the balancer drive gear 6 provided on the other end side of the drive-side balancer shaft 3 and configured to rotate integrally with the drive-side balancer shaft 3; the balancer driven gear 7 that meshes with the balancer drive gear 6; the driven-side balancer shaft 5 which is fixed to the balancer driven gear 7 on the other end side of the driven-side balancer shaft 5, extends beyond the one end side of the drive-side balancer shaft 3, and is configured to rotate integrally with the balancer driven gear 7; the drive mechanism 8 provided on the one end side of the driven-side balancer shaft 5 and including at least two gears meshing with each other; and the oil pump 9 driven based on a rotation force transmitted from the drive mechanism 8.

Thus, in the crankcase integrated balancer device 2, the overall length of the drive-side balancer shaft 3 and the driven-side balancer shaft 5 can be caused to function as the torque transmission path for transmitting the torque to the drive mechanism 8, and the gear rattle between the oil pump drive gear 8*a* and the oil pump driven gear 8*b* can thus effectively be decreased.

Second Embodiment

Figure 7:
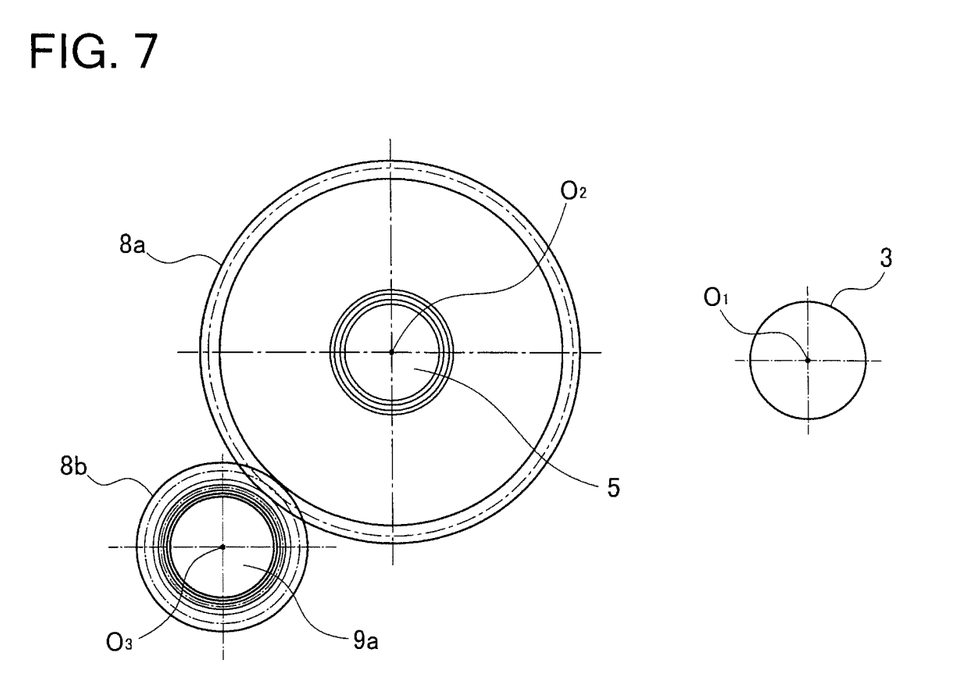
FIG. 7 is a schematic view for illustrating a position relationship between the drive-side balancer shaft 3, the driven-side balancer shaft 5, and the oil pump drive shaft 9a of a second embodiment.

A description is now given of a second embodiment. A basic configuration is the same as that of the first embodiment, and a description is given only of different points. FIG. 7 is a schematic view for illustrating a position relationship between the drive-side balancer shaft 3, the driven-side balancer shaft 5, and the oil pump drive shaft 9*a* of the second embodiment. In the second embodiment, a general fixed displacement type trochoid pump is employed as the oil pump 9. The rotation center $O_3$ of the oil pump drive shaft 9*a* is arranged on an opposite side from the rotation center $O_1$ of the drive-side balancer shaft 3 with respect to the rotation center $O_2$ of the driven-side balancer shaft 5 in the direction perpendicular to the axial direction of the driven-side balancer shaft 5. In other words, the oil pump driven gear 8*b* is provided on an opposite side from the drive-side balancer shaft 3 in the direction perpendicular to the axial direction of the driven-side balancer shaft 5. Moreover, the number of teeth $N_A$ of the oil pump drive gear 8*a* is set to be twice of the number of teeth $N_B$ of the oil pump driven gear 8*b*. As a result, the rotation speed of the oil pump drive shaft 9*a* is increased to twice of the rotation speed of the driven-side balancer shaft 5. Thus, the oil pump 9 can be rotated at the increased speed, and hence reduction in size can be promoted while an oil pump of a high rotation type is employed.

According to the second embodiment, the following actions and effects are provided.

(10-6) In the balancer device for an internal combustion engine according to Item (2-2) described above, the oil pump driven gear 8*b* is provided on the opposite side from the drive-side balancer shaft 3 in the direction perpendicular to the axial direction of the driven-side balancer shaft 5.

Thus, the oil pump 9 can be laid out on an opposite side from the drive-side balancer shaft 3 with respect to the driven-side balancer shaft 5.

Third Embodiment

Figure 8:
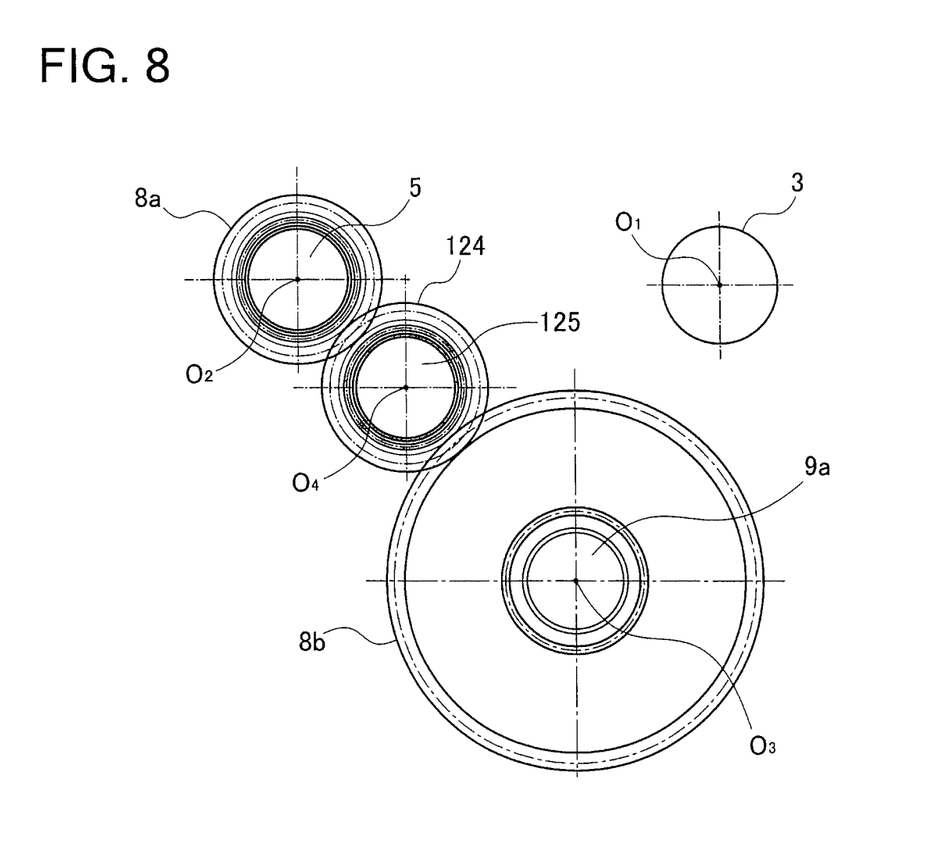
FIG. 8 is a schematic view for illustrating a position relationship between the drive-side balancer shaft 3, the driven-side balancer shaft 5, an intermediate gear shaft 125, and the oil pump drive shaft 9a of a third embodiment.

A description is now given of a third embodiment of the present invention. A basic configuration is the same as that of the first embodiment, and a description is given only of different points. FIG. 8 is a schematic view for illustrating a position relationship between the drive-side balancer shaft 3, the driven-side balancer shaft 5, an intermediate gear shaft 125, and the oil pump drive shaft 9*a* of the third embodiment. The drive mechanism 8 of the third embodiment includes an intermediate gear 124 in addition to the oil pump drive gear 8*a* and the oil pump driven gear 8*b*. The intermediate gear 124 is a helical gear, and is configured to mesh with the oil pump drive gear 8*a* and the oil pump driven gear 8*b*. The intermediate gear shaft 125 is supported rotatably with respect to the lower housing 4. A rotation center $O_4$ of the intermediate gear shaft 125 is arranged below the rotation centers $O_1$ and $O_2$ of the drive-side balancer shaft 3 and the driven-side balancer shaft 5, and above the oil pump driven gear 8*b*. Moreover, the rotation center $O_4$ of the intermediate gear shaft 125 is arranged between the rotation center $O_2$ of the driven-side balancer shaft 5 and the rotation center $O_3$ of the oil pump drive shaft 9*a* in the engine left-right direction.

The numbers of teeth of the oil pump drive gear 8*a*, the oil pump driven gear 8*b*, and the intermediate gear 124 are set so that a total speed reduction ratio of the drive mechanism 8 matches the speed reduction ratio (=2) of the drive mechanism 8 of the first embodiment. In the drive mechanism 8 of the third embodiment, the intermediate gear 124 is interposed between the oil pump drive gear 8*a* and the oil pump driven gear 8*b*. Accordingly, a desired gear ratio can be achieved while downsizing the respective gears. The intermediate gear 124 is fixed to the intermediate gear shaft 125.

Fourth Embodiment

Figure 9:
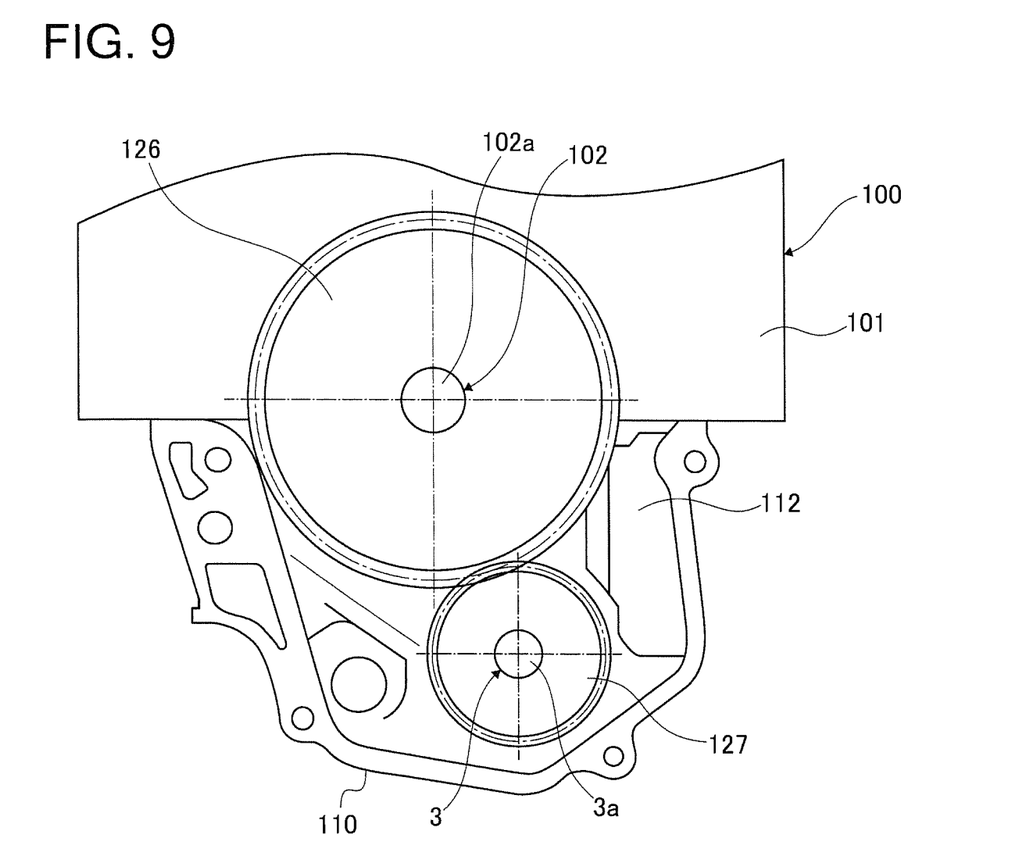
FIG. 9 is a front view of a lower part of the engine 100 on which the balancer device 2 according to a fourth embodiment is installed.

A description is now given of a fourth embodiment of the present invention. A basic configuration is the same as that of the first embodiment, and a description is given only of different points. FIG. 9 is a front view of a lower part of the engine 100 on which the balancer device 2 according to the fourth embodiment is installed. A balancer shaft drive gear 126 is fixed to the first end 102*a* of the crankshaft 102. Moreover, a balancer shaft driven gear 127 is fixed to the first end 3*a* of the drive-side balancer shaft 3. The balancer shaft driven gear 127 meshes with the balancer shaft drive gear 126. The number of teeth of the balancer shaft driven gear 127 is set to be ½ times of the number of teeth of the balancer shaft drive gear 126. The drive-side balancer shaft 3 is of the gear drive type, and a tensioner, which is required in the case of the chain drive, can thus be omitted. Moreover, in the crankcase 1, the support structure for the tensioner is no longer necessary, and hence reduction in size and simplification of the crankcase 1 can be realized.

Other Embodiments

The embodiments of the present invention have been described above based on each of the embodiments. However, the specific configuration of the present invention is not limited to the configuration described in each of the embodiments. A change in design without departing from the scope of the gist of the invention is encompassed in the present invention.

For example, the numbers of teeth of the oil pump drive gear and the oil pump driven gear may be the same as each other.

The number of intermediate gears interposed between the oil pump drive gear and the oil pump driven gear may be two or more.

A description is now given of other embodiments of the present invention.

(11-7) In the balancer device for an internal combustion engine according to Item (2-2) described above, the following expression is satisfied:

$$N_A < N_B,$$

where $N_A$ and $N_B$ represent the number of teeth of the oil pump drive gear and the number of teeth of the oil pump driven gear, respectively.

Thus, the oil pump can be rotated at the decreased speed.

(12-8) In the balancer device for an internal combustion engine according to Item (2-2) described above, the following expression is satisfied:

$$N_1 \geq N_B,$$

where $N_A$ and $N_B$ represent the number of teeth of the oil pump drive gear and the number of teeth of the oil pump driven gear, respectively.

Thus, the oil pump can be rotated at the constant speed or increased speed.

(13-9) In the balancer device for an internal combustion engine according to Item (1-1) described above, the drive mechanism includes the oil pump drive gear provided on the driven-side balancer shaft, the intermediate gear that meshes with the oil pump drive gear, and the oil pump driven gear that meshes with the intermediate gear.

Thus, a desired gear ratio can be achieved by using the intermediate gear while downsizing the respective gears.

(14-17) In the balancer device for an internal combustion engine according to Item (9-16) described above, the oil pump is contained inside the crankcase.

Thus, the device can be made compact.

(15-10) In the balancer device for an internal combustion engine according to Item (1-1) described above, the gears includes a helical gear.

Thus, silence can be achieved under a high speed and a high load.

(16-11) In the balancer device for an internal combustion engine according to Item (1-1) described above, the rotation force transmitted to the one end side of the drive-side balancer shaft is transmitted to the one end side via a chain.

Thus, the rotation speed of the crankshaft can be changed, and can then be transmitted to the drive-side balancer shaft at a remote position. Moreover, this configuration is advantageous in reduction in size compared with the gear drive.

(17-12) In the balancer device for an internal combustion engine according to Item (1-1) described above, the oil pump is a variable displacement type oil pump configured to change a displacement of a pump chamber in accordance with a predetermined state.

Thus, the discharge flowrate can be suppressed at an engine high rotation, and the fuel efficiency can thus be improved.

The embodiments of the present invention have been described above. The embodiments of the present invention described above are intended for easy understanding of the present invention, and do not limit the present invention. It is apparent that the present invention can be changed and modified without departing from the spirit thereof and encompasses equivalents thereof. Further, within a range in which the above-mentioned problems can be at least partially solved or within a range in which the effects are at least partially obtained, the components recited in the claims and described in the specification can be arbitrarily combined or omitted.

The present application claims priority to the Japanese Patent Application No. 2015-028227 filed on Feb. 17, 2015. The entire disclosure including the specification, the claims, the drawings, and the abstract of Japanese Patent Application No. 2015-028227 filed on Feb. 17, 2015 is incorporated herein in its entirety by reference.

REFERENCE SIGNS LIST

1 crankcase (housing), 2 balancer device, 3 drive-side balancer shaft, 3a first end, 3b second end, lower housing (housing), 5 driven-side balancer shaft, 5a first end, 5b second end, 6 balancer drive gear, 7 balancer driven gear, 8 drive mechanism, 8a oil pump drive gear, 8b oil pump driven gear, 9 oil pump, 100 engine (internal combustion engine), 102 crankshaft, 104 balancer sprocket (chain drive part), 105 drive chain

The invention claimed is:

1. A balancer device to be attached to a cylinder block of an internal combustion engine, the balancer device comprising:
   a drive-side balancer shaft to which a rotational force from a crankshaft is transmitted via a balancer sprocket provided at a drive-side first end among the drive-side first end and a drive-side second end which are both ends of the drive-side balancer shaft in a direction along a rotational axis of the drive-side balancer shaft;
   a balancer drive gear provided at the drive-side second end of the drive-side balancer shaft and configured to rotate integrally with the drive-side balancer shaft;
   a driven-side balancer shaft including a driven-side first end and a driven-side second end which are both ends of the driven-side balancer shaft in a direction along a rotational axis of the driven-side balancer shaft, a length of the driven-side balancer shaft in the direction along the rotational axis of the driven-side balancer shaft being shorter than a length of the drive-side balancer shaft in the direction along the rotational axis of the drive-side balancer shaft, the driven-side balancer shaft being disposed such that a direction from the drive-side first end toward the drive-side second end of the drive-side balancer shaft matches a direction from the driven-side first end toward the driven-side second end of the driven-side balancer shaft, a balancer driven gear provided at the driven-side second end of the driven-side balancer shaft, and configured to mesh with the balancer drive gear;

an oil pump drive gear provided at the driven-side first end of the driven-side balancer shaft;

an oil pump driven gear configured to mesh with the oil pump drive gear, a number of teeth of the oil pump driven gear being larger than a number of teeth of the oil pump drive gear; and an oil pump including a pump drive shaft coupled to the oil pump driven gear, the oil pump being provided between the balancer sprocket and the oil pump driven gear in the direction along the rotational axis of the drive-side balancer shaft.

2. The balancer device of claim 1, wherein:

a rotational axis of the pump drive shaft is disposed between a second imaginary line and a third imaginary line, and is disposed on a side opposite to the cylinder block side of the internal combustion engine with respect to a first imaginary line, when the first imaginary line is an imaginary line which orthogonally crosses the rotational axis of the drive-side balancer shaft and the rotational axis of the driven-side balancer shaft, the second imaginary line is an imaginary line which orthogonally crosses the rotational axis of the drive-side balancer shaft and the first imaginary line, and the third imaginary line is an imaginary line which orthogonally crosses the rotational axis of the driven-side balancer shaft and the first imaginary line, in an imaginary plane orthogonal to the rotational axis of the drive-side balancer shaft and the rotational axis of the driven-side balancer shaft.

\* \* \* \* \*